United States Patent  [15] 3,677,379
Adams  [45] July 18, 1972

[54] POWER ASSISTING ASSEMBLY FOR A CLUTCH MECHANISM

[72] Inventor: Madison B. Adams, 8063 San Jose Blvd., Jacksonville, Fla. 32217

[22] Filed: June 9, 1970

[21] Appl. No.: 44,724

[52] U.S. Cl. ...................................192/91 R, 91/391 A
[51] Int. Cl. ......................................................F16d 25/08
[58] Field of Search ..........................192/91 R, 83; 91/391 A

[56] References Cited

UNITED STATES PATENTS

| | | | |
|---|---|---|---|
| 2,908,364 | 10/1959 | Alfieri | 192/3.57 |
| 1,729,173 | 9/1929 | Marfaing | 192/91 |
| 2,152,089 | 3/1939 | Price et al. | 192/91 X |
| 2,706,020 | 4/1955 | Freers et al. | 91/391 A |
| 3,063,427 | 11/1962 | Hill | 91/391 A |
| 3,263,428 | 8/1966 | Highley | 91/391 A |
| 3,448,842 | 5/1969 | Nordstrom | 192/91 |

Primary Examiner—Benjamin W. Wyche
Attorney—George H. Baldwin and Arthur G. Yeager

[57] ABSTRACT

The assembly includes a pair of levers with a link between one lever and clutch pedal and another link between the other lever and clutch plate. A spring loaded piston and cylinder selectively locks the levers together for normal actuation of the plate by depression on the pedal by an operator. The levers are unlocked by actuation of a valve to supply fluid pressure to the latter cylinder, and a pinion portion of a rack and pinion mechanism is attached to one lever connected to the pedal with a rack portion of the mechanism being coupled to the other lever. Another piston and cylinder selectively locks the one lever in a short pedal stroke position for receiving the power assist from a selectively actuatable piston and cylinder which is operably coupled to the other lever connected to the plate for forcibly moving same in response to control forces on the pedal. A valve controls the latter piston and cylinder upon control forces being applied to the pedal by an operator to supply pressurized fluid thereto.

29 Claims, 7 Drawing Figures

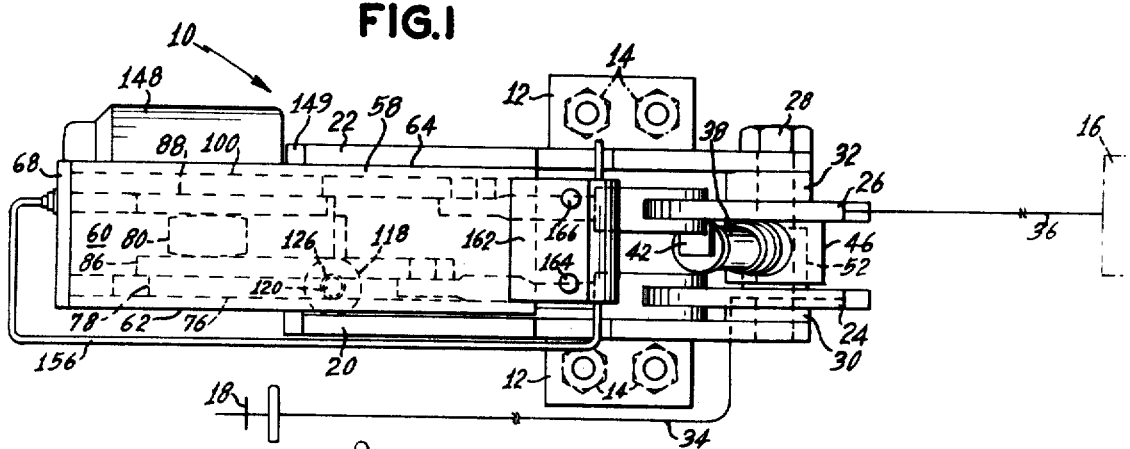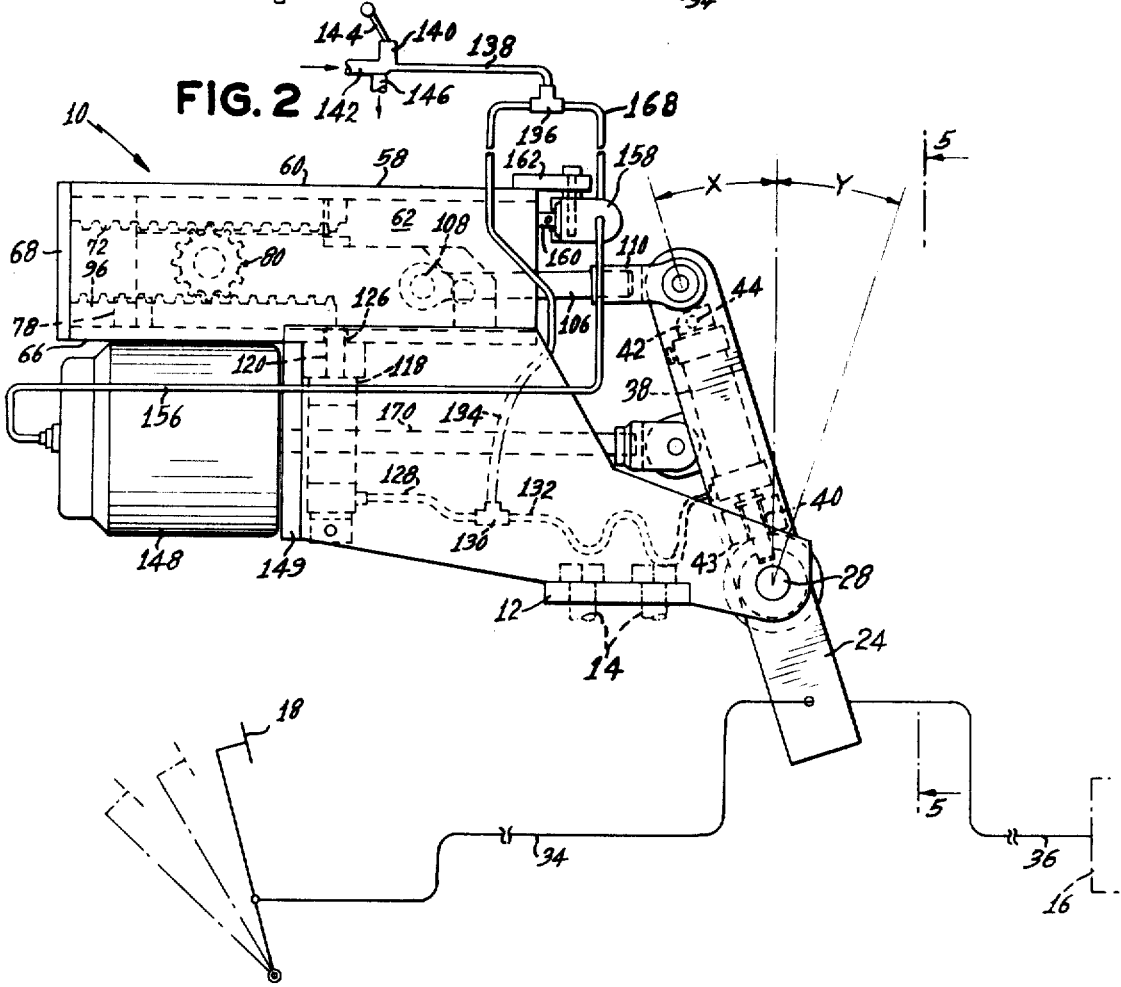

INVENTOR
Madison B. Adams

BY
George H. Baldwin
ATTORNEY

Patented July 18, 1972
3,677,379
3 Sheets-Sheet 3
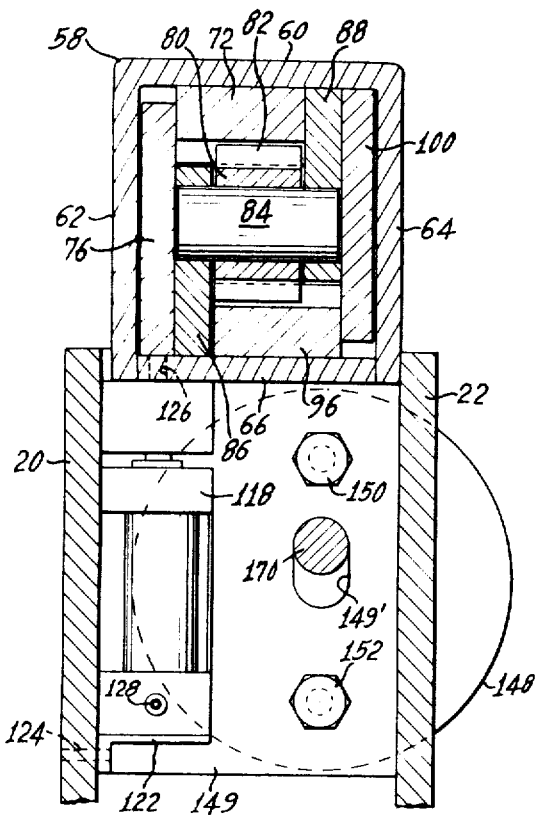
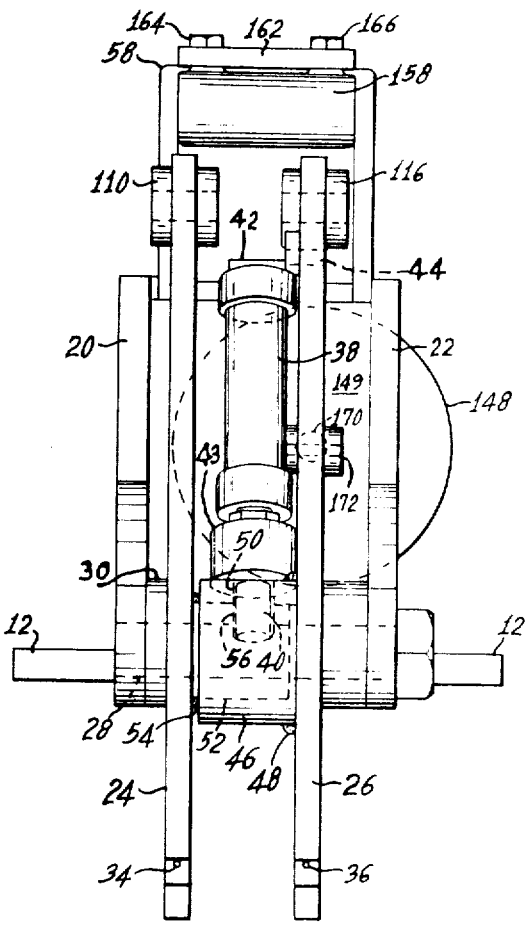
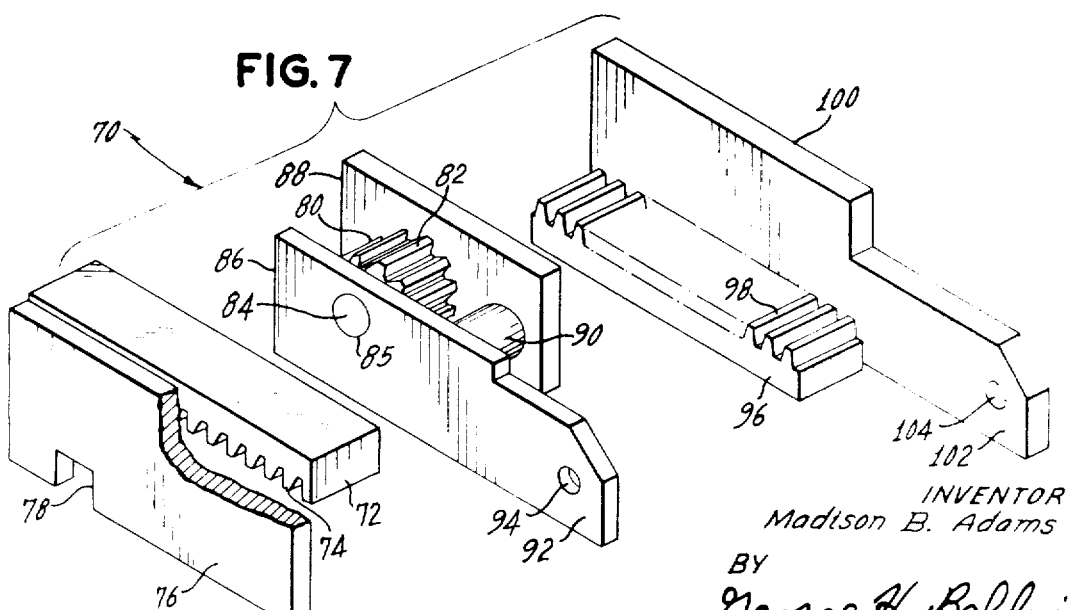
INVENTOR
Madison B. Adams
BY George H. Baldwin
ATTORNEY

POWER ASSISTING ASSEMBLY FOR A CLUTCH MECHANISM

BACKGROUND OF THE INVENTION

1. Field of the Invention

This invention relates to a power assisting assembly for clutch mechanisms for motor trucks, tractors, automobiles and other like motor propelled vehicles, particularly of the heavy type designed for commercial duty and often including a large number of forward transmission gears.

The power transmission systems of many motor vehicles, especially trucks, are equipped with manual, in contradistinction to automatic gear shifting mechanisms. With manual gear-shifting mechanisms, the spring pressure of the clutch mechanism, including springs holding friction elements, must be temporarily overcome to cause the friction elements to be disengaged during that time period when the transmission gears are shifted. Typically the clutch is temporarily disengaged by means of a mechanical linkage system that terminates in a depressable foot pedal extending above the floor of the vehicle operator's compartment. The repeated manual and unassisted depression of the clutch foot pedal over a long throw or stroke interval by the vehicle operator each time the gears are shifted is eventually tiring to the operator especially in the case of large overland trucks wherein a multitude of gears must be shifted often and wherein the clutch pedal is relatively difficult to depress repeatedly over a long trip or in city driving where repetitive gear shifting is required.

The invention relates to a power assisting assembly for a clutch mechanism, and has for an object the provision of an assembly which will work the clutch with a minimum effort on the part of the operator. The invention additionally relates to a fluid power assisting assembly, particularly of the pneumatic type, for transmission clutch mechanisms for motor vehicles, and in particular relates to a novel air-assisted assembly which can be switched between its off and on positions at a location adjacent the vehicle operator, such that the pneumatic assembly assisting the clutch may be conveniently, easily and manually turned on and off by the vehicle operator.

2. Description of the Prior Art

An air booster clutch assembly, live air powered clutch assembly and other powered clutch assemblies have been previously suggested but have not proven to be satisfactory for one or more reasons. Exemplary of some of the prior art arrangements are the following U. S. Pats: Nos. 1,133,206; 2,058,586; 2,075,032; 2,104,580; 3,195,417 and 3,435,929. Such prior art fails, however, to teach an assembly or mechanism which could be adapted in any obvious manner to achieve the results or perform the functions of the power assisting assembly described and claimed herein.

SUMMARY OF THE INVENTION

Aspects of the power assisting assembly for a clutch mechanism, in which the mechanism has a clutch pedal means in an operator compartment coupled to a clutch plate means wherein the clutch pedal means has a predetermined length of stroke for operating the clutch plate means in response to forces adapted to be applied to the pedal means by the operator, include the provision of means for reducing the stroke of the clutch pedal means, and selectively acctuatable power means connected between the clutch pedal means and the clutch plate means to forcibly move the clutch plate means in response to control forces on the clutch pedal means during the reduced stroke of the clutch pedal means.

A pair of levers comprise the means for reducing the stroke and first linkage means connect one lever to the pedal and a second linkage means connect the other lever to the plate. Means are provided for selectively locking the levers together whereby forcibly depression of the pedal will cause the plate to become disengaged. The selectively actuatable power means is connected to the other lever for forcibly moving the other lever in response to control forces on the pedal while the levers are in unlocked condition and during actuation of the other lever by the power means.

In other aspects of the invention the means for selectively locking the levers together includes a power cylinder element and piston element with means for coupling one element to one lever, and means for coupling the other element to the other lever. The power means includes a first fluid power means connected to the other lever for moving the plate in a disengaging direction and valve means fluidly connected to the power cylinder element and to the first means for respectively controlling the locking of the levers and the fluid power being applied to the first means. The valve means are responsive to depression and relaxation of the pedal by an operator whereby fluid is supplied to and removed from the first means. The valve means includes an on-off valve for controlling the locking of the levers. The piston element is spring loaded in a direction to lock the levers with the on-off valve being in the on condition to override the spring loading of the piston element whereby to unlock the levers. The valve means also includes another valve in fluid series between the on-off valve and the first means and being responsive to depression and relaxation of said pedal by an operator to control the fluid supplied to and removed from the first means.

The means for reducing the stroke of the clutch pedal includes a rack and pinion mechanism connected to each of the levers, the rack and pinion mechanism having a first position when the levers are locked together and a second position when the levers are in unlocked condition, and means for selectively locking the rack and pinion mechanism in the second position. The means for selectively locking the rack and pinion assembly in the second position comprises a fluid power means and a selective valve means for controlling the supply of fluid thereto. The rack and pinion assembly includes a pinion coupled to the pedal, and a rack and the fluid power means lockingly engages the rack upon the supply of fluid thereto and after movement of the pedal into a reduced stroke position.

A general object of this invention is to provide an improved power assisting assembly for a clutch mechanism.

A particular object of the invention is to provide an auxiliary power assisting assembly that is powered by pressurized fluid whereas to prevent fatigue to the motor vehicle operator caused by repeated depression of the clutch.

Another particular object is to provide an air-powered clutch assisting assembly that is auxiliary to and operates in combination with the foot pedal mechanical linkage type clutch actuation mechanism normally employed in a vehicle.

A further particular object of the invention is to provide a power assisting assembly in which the regular foot operation, control and feel on the clutch pedal is maintained and actuation of the pedal requires a minimum of effort by the vehicle operator.

An additional particular object is to provide a power assisting assembly for a clutch mechanism in which the pedal stroke is shortened during such power assist.

A specific object of the invention is to provide a simple and reliable assembly controlled by air pressure for aiding in releasing the clutch which forms the connecting link between the shaft of the engine and the drive shaft of the vehicle and which will require very little exertion on the part of the vehicle operator.

Another specific object is to retain the ordinary mechanical means for operating the clutch of a heavy vehicle such that the pneumatic assisting means may be used in connection therewith, thus enabling the mechanical means to be used in cases of emergency, i. e., when the pneumatic assisting means should fail or for any other reason desired by the operator.

A further specific object of the invention is to provide a power assisting assembly by which the operator of a motor vehicle may at will render active the assembly to aid in the releasing of the vehicle's clutch under certain conditions thereby facilitating ready gear-changing within the transmission of the vehicle.

An additional specific object is the provision of an improved power assisting assembly for a clutch mechanism in which the power may be turned off and on manually by the operator and in which upon failure of the power assisting assembly the clutch mechanism will return to power unassisting control by the operator.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a top plan view of the power assisting assembly for a clutch mechanism of this invention;

FIG. 2 is a side elevational view of the power assisting assembly;

FIG. 5 is an enlarged end elevational view taken along line 5—5 of FIG. 2;

FIG. 6 is an enlarged cross-sectional view taken along line 6—6 of FIG. 4; and

FIG. 7 is an enlarged and disassembled perspective view of a portion of the power assisting assembly of this invention.

DETAILED DESCRIPTION OF THE PREFERRED EMBODIMENT

Figure 3:
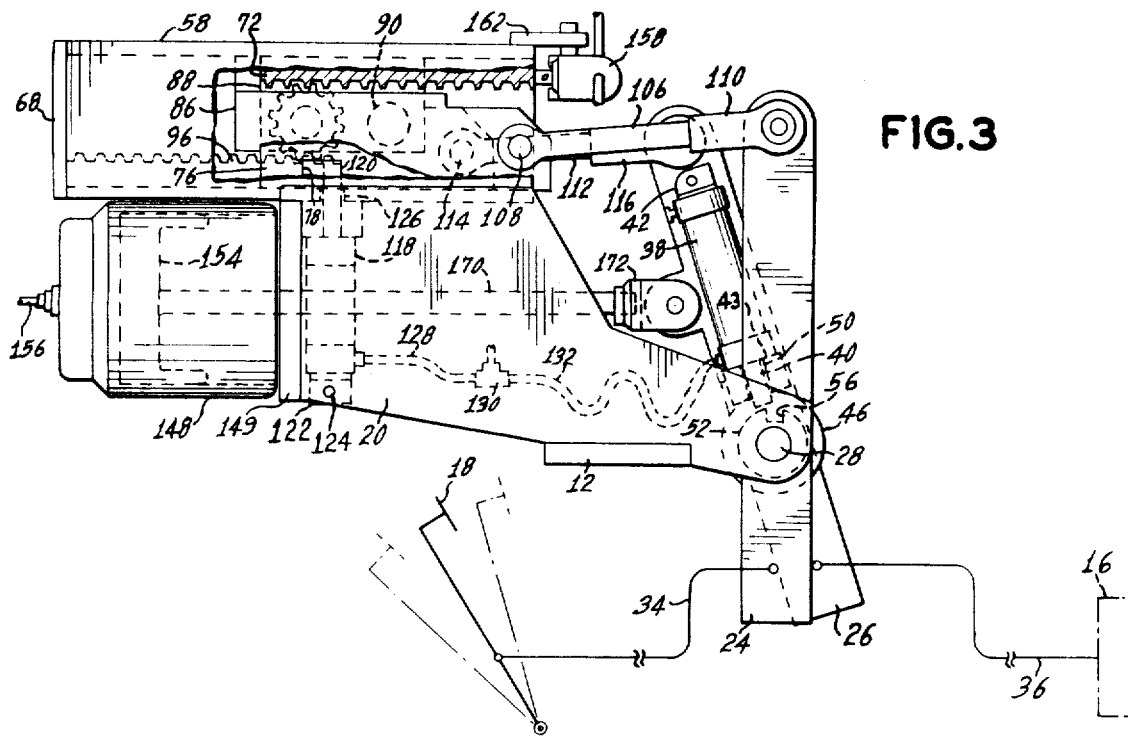
FIG. 3 is another side elevational view of the assembly, portions thereof being in a second position.

With detailed reference to the drawings, and in particular to FIGS. 1 and 2 thereof, the improved power assisted assembly 10 for a clutch mechanism of this invention, being particularly adapted for use in and with heavy duty motor trucks, is depicted with mounting plate means 12 and bolt means 14 for mounting the same to the frame (not shown) of the heavy duty vehicle. The power assisted assembly 10 is usually mounted to and positioned on the truck frame at a point between the truck's clutch mechanism, including clutch plate 16, and the clutch operating mechanism, including clutch pedal 18, although the same need not be so positioned if it is desired that its placement be otherwise.

Power assisted assembly 10 includes a pair of side members or frame members 20 and 22 (see in particular FIGS. 1 and 6) to which members mounting plate means 12 is attached adjacent the lower edges thereof. Mounted between side or frame members 20 and 22 adjacent their rearward end portion is a pair of levers, including left hand lever 24 and right hand lever 26. The pair of levers 24, 26 are mounted along their mid-portion to side members 20, 22 by means of a shift 28 extending through the side frame members and the pair of levers, such that the levers are free to pivot independently of each other on mounting shaft 28 between side frame members 20 and 22. Spacers 30 and 32 are provided to maintain respective levers 24 and 26 spaced at a distance from respective side or frame members 20 and 22.

Figure 4:
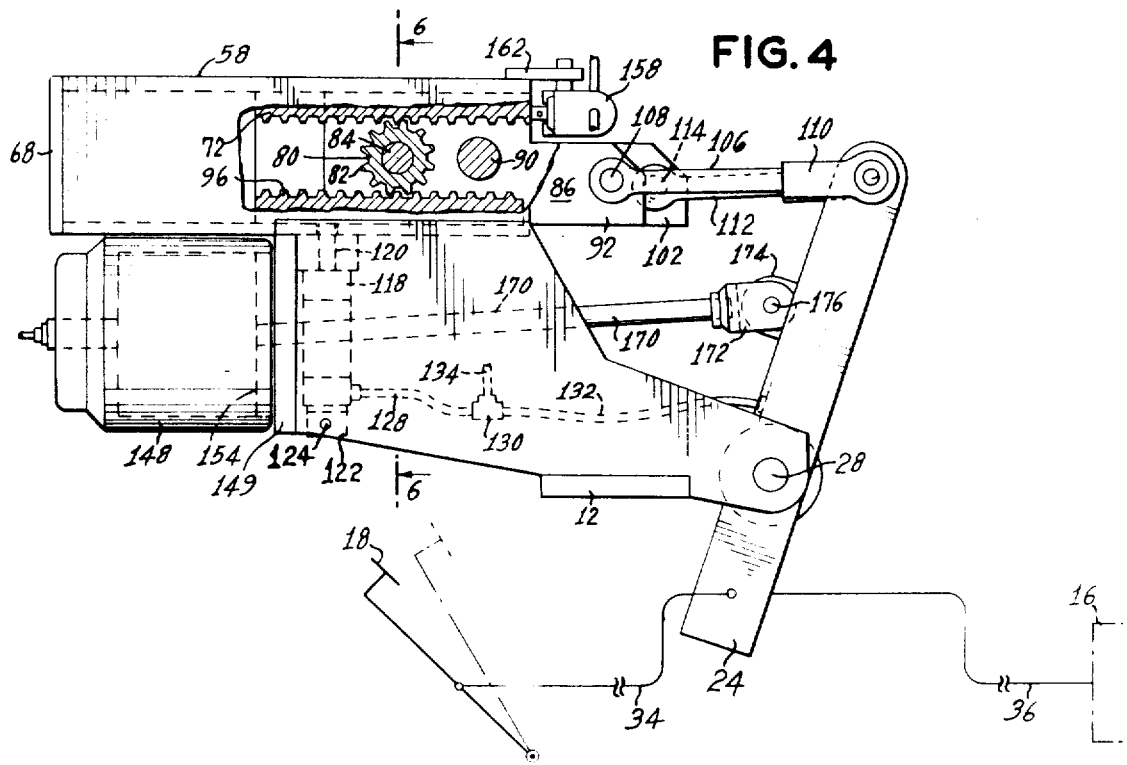
FIG. 4 is another side elevational view thereof, with portions being in yet another position.

Left hand lever 24 is connected at its lower end portion to clutch pedal 18 by an armored cable 34 or the like extending therebetween, but not necessarily in a straight, direct line between the two. Upon depression of clutch pedal 18 the lower end portion of lever 24 is moved forward or in a leftward direction and the upper end portion thereof is moved rearward or in a rightward direction, with the lever pivoting about shaft 28, as seen in FIG. 4. The lower end portion of right hand lever 26 is attached to the clutch mechanism and one of the clutch pressure plates 16 thereof by an armored cable 36 or the like extending therebetween, but not necessarily along a straight or direct path between the two. Upon the forward or leftward movement of the lower end portion of lever 26 the clutch mechanism is actuated and clutch pressure plate 16 is separated or disengaged from the other pressure plate within the clutch mechanism, while the upper end portion of lever 26 moves rearward or to the right, as best seen in FIG. 4. While cables 34 and 36 have been shown in the various figures of the drawings, other mechanical linkages, possibly employing rods, levers and other inflexible members, could be used just as readily as the armored cable members, assemblies and arrangements as depicted in the drawings.

Since the pair of levers 24 and 26 are adapted, arranged and mounted on shaft member 28 to pivot independently of each other, the system or mechanism could be a straight mechanical linkage between clutch pedal 18 and clutch mechanism 16 if the levers were fixed or connected together, such that when one of the levers moves the other lever would move therewith and in a like amount. In order to accomplish this straight mechanical linkage between clutch pedal 18 and clutch pressure plate 16 of clutch mechanism, a pneumatic cylinder 38 and piston 40 is provided which is mounted to the inner side of lever 26 by a piston mounting guide sleeve 43 attached to lever 26 and a mounting bracket 42 attached to the upper end portion of lever 26 by attaching means 44 (see in particular FIGS. 1, 2 and 5). A hollow cylindrical member or sleeve 46 is attached by welds 48 to lever 26 and is positioned thereon to be concentric with shaft 28 extending therethrough. Cylindrical sleeve member 46 has its other or outer free edge spaced slightly from lever member 24 so as to not interfere with its pivoting and further includes an opening 50 extending through its upper portion to accommodate piston 40 of pneumatic cylinder 38. An inner cylindrical member or sleeve 52 is attached to lever 24 by welds 54 to rotate therewith and is concentric with shaft 28 passing therethrough. Cylindrical member 52 fits within larger cylindrical member or sleeve 46 and its outer or free edge terminates just short of the bottom of sleeve 46 and lever 26 so as not to interfere with the pivoting of lever 26 and attached sleeve 46. Inner cylindrical member 52 is provided with a circular opening 56 adjacent its upper portion to accommodate piston 40 of pneumatic cylinder 38 when completely extended and when opening 56 is in alignment with opening 50 upon alignment of respective levers 24 and 26.

Piston 40 of pneumatic cylinder 38 is pneumatically retracted and spring extended, and will normally engage within opening 56 of respective sleeve 52 extending through opening 50 within respective sleeve 46 upon alignment thereof and alignment of levers 24 and 26. When piston 40 is positioned within openings 50 and 56 the pair of levers 24, 26 are locked together such that one moves with the other through the same increment or arc, see FIGS. 1, 2 and 5 in particular for this locking feature. When levers 24 and 26 are locked together as above described, the linkage and operation between clutch pedal 18 and clutch mechanism or clutch plate 16 is purely a mechanical one, thus still permitting operation of the clutch by the truck driver, should a failure develop in the truck's air pressure system, or should it be desired to operate the clutch on a completely manual, unassisted mechanical basis for some other reason, as is sometimes desirable in starting the truck from a stopped position.

Attached to side or frame members 20 and 22 and adjacent the upper edges thereof, is a housing 58 including a top wall 60, a pair of side walls 62 and 64, and a bottom wall 66, see in particular FIGS. 2 and 6. Housing 58 includes a forward end wall 68 (see FIGS. 1 through 4) closing the forward end portion of the housing, while the rear end portion thereof remains open. Positioned within housing 58 is a sliding gear and rack mechanism 70, shown in FIG. 7 in disassembled detail.

The sliding gear and rack mechanism 70 includes an upper rack member 72 having teeth 74 spaced along its lower side and a side mounting or carrying member 76 attached to the left hand side of rack 72 and extending generally perpendicularly downward therefrom. Side member 76 is provided with a notch 78 adjacent its lower forward end portion, the purpose and function of which will be explained more fully hereinbelow. Mechanism 70 further includes a gear member 80 having teeth 82 spaced equally therearound for engagement with upper rack 72 and the teeth 74 thereof. Gear 80 is mounted on shaft 84 and at reference number 85 for rotation within a pair of side supporting or carrying members 86 and 88, which are further held together, strengthened and rigidified by a connecting and spacing element 90 positioned between and connected to side members 86 and 88. Supporting side member 86 includes a rearwardly extending tongue portion 92 having an opening 94 extending through its rearward end portion, the purpose and function of which will be explained more fully hereinbelow. Additionally included within sliding rack and gear mechanism 70 is a lower rack member 96 having teeth 98 spaced along its upper side which engage with teeth 82 of gear 80. Rack 96 is connected along its right hand side to and is carried and supported by a generally perpendicular side member 100, which includes a rearwardly extending tongue portion 102 having an opening 104 extending through its rearward end portion, the purpose and function of which will be explained more fully hereinbelow. All of the several portions and members of gear and rack mechanism 70 fit and intermesh with each other, and are positioned within and slide freely within housing 58 as can be seen in FIGS. 2 and 6.

Gear 80 is attached to the upper end portion of left hand lever 24 by a rod 106. The forward end portion of rod 106 is pivotally attached to the rearwardly extending tongue portion 92 of side member 86 by means of a pin 108 extending through opening 94 therein, and the rearward end portion of rod 106 is pivotally attached to the upper end portion of lever 24 by means of an adjustable clevis 110, the pin of which passes through an opening within the upper end portion of lever 24. Adjustable clevis 110 allows for minor adjustments in the length of rod 106.

Lower rack member 96 is connected to right hand lever 26 by a rod 112. The forward end portion of rod 112 is pivotally attached to rearwardly extending tongue portion 102 of side member 100 by means of a pin 114 extending through opening 104 therein, and the rearward end portion of rod 112 is pivotally connected to the upper end portion of lever 26 by an adjustable clevis 116, the pin of which extends through an opening within the upper end portion of lever 26. Adjustable clevis 116 allows for small adjustments in the length dimension of rod 112.

Power assisting assembly 10 further includes a pneumatic cylinder 118 and piston 120 mounted to the inside of side frame member 20. Cylinder 118 is attached to side member 20 by means of a mounting bracket 122 and attaching means 124 extending through the bracket and into side member 20. The piston 120 of pneumatic cylinder 118 is spring retracted into the cylinder and pneumatically extended from the cylinder upward through an opening 126 within bottom wall 66 of housing 58 to engage within opening or notch 78 within side carrying member 76 of upper rack member 72 when notch 78 is in alignment with opening 126 and piston 120, see in particular FIGS. 2, 3 and 6. Pneumatic cylinder 118 is provided pressurized air through air flowline 128 connected to one side of a tee 130. Hereinabove described pneumatic cylinder 38 is supplied with pressurized air through air flowline 132 extending between and connected to another side of tee 130 and cylinder 38. An air flowline 134 extends between the third side of tee 130 and one side of a second tee 136. Coming out of another side of tee 136 in the air flow and supply system for assembly 10 is an air flowline 138, which connects the pneumatic system of assembly 10 to the air pressure system through valve 140 and flowline 142 of the truck (such air pressure system being normally found on all heavy duty trucks). With the lever 144 of valve 140 in one position, pressurized air will be supplied to the air system of assembly 10, while with lever 144 of valve 140 in its other position, pressurized air from the truck's air pressure system will be shut-off, with assembly 10 being exhausted of pressurized air through flowline 146, see in particular FIG. 2 for the pneumatic system and its flowlines of power assisted assembly 10.

Power assisting assembly 10 additionally includes a pneumatic power cylinder 148 connected, by means of bolt and nut assemblies 150 and 152, to a mounting plate attached to and extending between the front end portions of side members 20 and 22. Pneumatic power cylinder 148 includes an expandable rubber diaphram and diaphram plate 154, with plate 154 moving rearward within cylinder 148 upon air pressure being applied to the cylinder, and the rubber diaphram within the cylinder expanding as plate 154 moves rearward or to the right within cylinder 148, as depicted in FIGS. 3 and 4. Power cylinder 148 is supplied pressurized air through air flowline 156, one end of which is attached to cylinder 148, from the pressurized air system of assembly 10. The other or opposite end of air flowline 156 is attached to the discharge side of an air control valve 158 which includes an actuating stem 160. Air control valve 158 is mounted to a connecting bracket 162 by means of a pair of bolts 164 and 166, bracket 162 being affixed to top wall 60 of housing 58. Air control valve 158 is connected by air flowline 168 to the third side of tee 136 within the pressurized air system of assembly 10.

Fixedly attached to diaphram plate 154 of power cylinder 148 is a push rod 170 which extends through slot 149' in plate 149, and the opposite end of rod 170 has mounted thereon an adjustable clevis 172. Clevis 172 is pivotally attached to a projection 174 connected to lever 26 along its mid-portion, with the pin 176 of clevis 172 extending through an opening within projection 174. The adjustable feature of clevis 172 permits small adjustments in the length dimension of push rod 170. Upon actuation of pneumatic power cylinder 148 by the entry of pressurized air thereinto through flowline 156, piston 154 therein will be pushed rearward or in a right-hand direction, whereby push rod 170 will exert a force against the upper portion of lever 26 to pivot same about mounting shaft 28, thereby disengaging clutch plate 16 from the other plate within the clutch mechanism through cable 36.

The clutch mechanism includes the clutch pedal means 18 and a moveable clutch plate means 16 with selective means in the form of assembly 10 for connecting the pedal to the plate alternatively for manual operation and power operation. The selective means includes a first mechanical connection means, including cylinder 38, coupling the pedal to the plate for operation of the plate in response to pedal movement through a pedal stroke of predetermined distance. The selective means also includes a second mechanical connection means, including the rack and pinion mechanism 70, coupling the pedal to the plate for operation of the plate in response to pedal movement through a stroke of the pedal through a distance reduced from such predetermined distance. Furthermore, the selective means has a power means, including cylinder 148, connected to the pedal means and operatively coupled to the plate means; and manually operable selection means, including valve 140 and associated tubing, to selectively enable the pedal means to energize the power means and to disable the first mechanical connection means (38). The power means when energized is operable to control the clutch plate means in response to manual movements of the pedal means through said reduced distance.

In employing the power assisted assembly 10 of this invention and putting the same into operation, lever 144 of valve 140 (see FIG. 2) will be positioned such that pressurized air will flow through flowline 142 from the air pressure system of the truck to and into flowline 138 and the pneumatic system of mechanism 10. With pressurized air flowing through flowlines 134 and 132, piston 40 of cylinder 38 will be retracted upward from within opening 56 of sleeve member 52 whereby levers 24 and 26 will become unlocked from one another and be free to pivot independently of each other about shaft 28.

Clutch pedal 18 starting in the position as depicted in FIGS. 1 and 2, the next step will be for the truck operator to depress clutch pedal 18 approximately half way to the truck's floor into a position as depicted in FIG. 3. This operation, of dropping clutch pedal 18 approximately half way to the truck's floor, pivots lever 24 about shaft 28 to a nearly vertical upright position and moves gear member 80 and its side members 86 and 88 rearward within housing 58 as can be seen in FIG. 3. As gear 80 moves rearward upper rack member 72 moves rearward to touch or engage with stem 160 of control valve 158, as the lower rack member 96 is retained in its forward position by the spring resistance of clutch plate 16 within the clutch mechanism acting through cable 36, lever 26 and connecting rod 112. When freely movable upper rack member 72 moves rearwardly and touches or engages with stem 160 of air control valve 158, piston 120 of cylinder 118 will move upward to engage within opening or notch 78 of side member 76 supporting upper rack member 72 upon alignment thereof, thereby locking rack member 72 in its rearward position touching stem 160 of valve 158 as depicted in FIG. 3. Piston 120 of cylinder 118 is being constantly urged upward by the air pressure in cylinder 118 flowing thereto through flowline 128 and passes through opening 126 within housing 58 before entering notch 78. With rack member 72 in its rearwardly locked position (piston 120 engaged within notch 78), the rack member 72 is still capable of small forward and rearward movement as the width of notch 72 is somewhat greater than the width (diameter) of piston 120. At this point the clutch mechanism of the truck is ready for power assisted operation in which the work required by the operator will be greatly reduced and the clutch pedal stroke will be approximately half the normal pedal stroke, while at the same time giving the truck operator complete feel and smooth control of the clutch through the clutch pedal.

Upon further depression of clutch pedal 18, from its "dropped" or half way depressed position as depicted in FIG. 3, toward or into its fully depressed position, depicted in FIG. 4, upper rack member 72 will be urged against stem 160 of control valve 158 by means of gear 80 connecting rod 106, lever 24 and cable 34. Upon depression of actuating stem 160 of air controlled valve 158, pressurized air will move from flowline 168 through valve 158 and flowline 156 into power cylinder 148. The pressurized air within pneumatic power cylinder 148 will move plate 154 and expand the rubber diaphram within the cylinder, moving plate 154 rearwardly whereby lever 26 is pivoted about shaft member 28 through push rod 170. When lever 26 is pivoted about shaft member 28 by push rod 170 clutch plate 16 of clutch mechanism will be slightly disengaged from the clutch plate within the mechanism through cable 36. If clutch pedal 18 remains in a partly depressed position, the air supply to power cylinder 148 from air control valve 158 stops and the clutch holds at the partially disengaged position. With further depression of clutch pedal 18 the airflow to the power cylinder 148 will continue, whereby clutch plate 16 will be completely released from the other clutch plate within the clutch mechanism upon full depression of clutch pedal 18, as depicted in FIG. 4. Should the truck operator let up on clutch pedal 18 at any time, the action would reduce pressure on stem 160, allowing the air within power cylinder 148 to exhaust through air control valve 158, thereby releasing and permitting engagement of clutch plate 16 within the clutch mechanism. The air control valve may be of any suitable type but a three way two stage spring poppet valve with a normally open exhaust of the type manufactured by Schrader Fluid Power Products, Division of Scovill Manufacturing Co., Wake Forest, N. C. 27587, and identified as Schrader No. 3419, is well suited for this assembly.

With levers 24 and 26 locked together as in FIGS. 1 and 2, the stroke of pedal 18 causes the levers to travel through the arcs represented by X and Y in FIG. 2. When levers 24 and 26 are unlocked as in FIG. 3, lever 24 assumes the general upright position, i. e., lever 24 is moved through arc X with the pedal being dropped approximately half-way through its normal stroke. With the power on and the pedal is depressed from its full line position in FIG. 3 through the bottom of its stroke as indicated in the full line position in FIG. 4, the lever 24 travels through arc Y while lever 26 travels through arcs X and Y.

As clutch plate 16 is partially disengaged from the other clutch plate within the clutch mechanism by the pivoting of lever 26 about shaft 28, lower rack member 96 moves rearward rotating or rolling gear 80 and moving upper rack member 72 slightly forward away from stem 160 of air control valve 158 to thereby stop pressurized air flow to power cylinder 148. Upon further depression of clutch pedal 18, upper rack member 72 is again brought into contact and operates stem 160 of air control valve 158 applying pressurized air to power cylinder 148 to thereby further pivot lever 26 about shaft member 28 and further disengage clutch plate 16 from the other clutch plate within the clutch mechanism; until clutch pedal 18 is fully depressed and the interaction within the clutch mechanism completely disengages or releases clutch plate 16 from the other clutch plate within clutch mechanism, as hereinabove set forth (see FIG. 4). This type of action and inter-action allows the truck driver to have complete feel of the clutch and permits not only a full control thereof but also a control which can be felt and operated in a much softer manner than without the power assisting assembly 10 of this invention. The above described action and complete feel of the clutch by the truck operator permits a fast, smooth clutching during the truck operation, which results in a reduced wear on the clutch and less fatigue on the truck driver.

If the pressurized air supply to the pneumatic system of assembly 10 falls off, fails or the same is exhausted by the turning of lever 144 of valve 140, the air pressure within the system will exhaust through air control valve 158, and a light touch on clutch pedal 18 by the truck operator's foot will release the same whereby pedal 18 will return to its full height above the truck floor for standard operation of the truck's clutch mechanism. When the air pressure within the pneumatic system of assembly 10 fails or is otherwise exhausted, piston 120 of cylinder 118 will be retracted from notch or opening 78 within side member 76 of upper rack member 72, permitting the same to return to its forward position as depicted in FIG. 2, and piston 40 of cylinder 38 will be spring returned into opening 56 within cylindrical member 52 to lock levers 24 and 26 together for simultaneous operation thereof and direct, unassisted, mechanical operation of the clutch mechanism by the clutch pedal. Thus the clutch mechanism of the truck can be either a power assisted operation or a standard mechanical, non-power assisted operation when necessary or desired.

Assembly 10 of this invention provides for a power operated clutch linkage which will greatly reduce the work required by the truck operator, which is directly connected to the clutch control pedal thereby affording the truck operator complete feel and smooth control of the clutch mechanism, and in which the above is provided with a much reduced and shortened clutch pedal stroke. The mechanism of the invention not only makes use of the pressurized air system existing on most all trucks of the type with which this invention is concerned, but also is available in a single compact unit which can be readily installed on and with any existing heavy duty truck clutch linkage. The assembly of the invention is further provided with a control valve to switch the truck's pressurized air supply system on or off to the mechanism whereby if necessary, due to a failure in the pressurized air supply, or if desired the mechanism can be and will be automatically reverted to the standard, mechanical, non-power assisted direct clutch operation.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a clutch mechanism comprising a clutch pedal means and a moveable clutch plate means, selective means for connecting said pedal means to said plate means alternatively for manual operation and power operation, said selective means including a first mechanical connection means coupling said pedal means to said plate means for operation of said plate means in response to pedal movement through a pedal stroke of predetermined distance, said selective means including a second mechanical connection means coupling said pedal means to said plate means for operation of said plate means in response to pedal movement through a stroke of said pedal means through a distance reduced from said predetermined distance, said selective means including power means connected to said pedal means and operatively coupled to said plate means and manually operable selection means to selectively enable said pedal means to energize said power means and to disable said first mechanical connection means, said power means when energized being operable to control said clutch plate means in response to manual movements of said pedal means through said reduced distance.

2. In the clutch mechanism as defined in claim 1 wherein said selective means includes a pair of levers, said clutch pedal means includes a pedal and linkage means connecting between said pedal and one of said levers, said clutch plate means includes a moveable plate and linkage means connecting between said plate and the other of said levers, said manually operable selection means includes means for selectively locking said levers together whereby upon forcible depression of said pedal said plate becomes disengaged, said power means being connected to said other lever for forcibly moving said other lever and linkage means and plate in response to movements of said pedal, said levers being in unlocked condition by said means for selectively locking said levers while remaining connected through said second mechanical connection means during actuation of said other lever by said power means.

3. In the clutch mechanism as defined in claim 2 wherein said selective means includes valve means fluidly connected to said power means for controlling the fluid thereto, said valve means being responsive to depression and relaxation of said pedal whereby fluid is supplied to and removed from said power means.

4. In the clutch mechanism as defined in claim 1 wherein said selective means includes valve means fluidly connected to said power means for controlling the fluid thereto, said valve means being responsive to depression and relaxation of said clutch pedal means through said reduced stroke whereby fluid is supplied to and removed from said power means.

5. In a clutch mechanism comprising a clutch pedal means and a clutch plate means, said clutch pedal means having a predetermined length of stroke for operating said clutch plate means in response to forces adapted to be applied to said pedal means, means for reducing the stroke of said clutch pedal means, and selectively actuatable power means connected between said clutch pedal means and said clutch plate means to forcibly move said clutch plate means in response to control forces on said clutch pedal means adapted to be applied thereto during the reduced stroke of said clutch pedal means, said means for reducing the stroke of said clutch pedal means includes a pair of levers, said clutch pedal means includes a pedal and linkage means connecting between said pedal and one of said levers, said clutch plate means includes a plate and linkage means connecting between said plate and the other of said levers, means for selectively locking said levers together whereby upon forcible depression of said pedal said plate becomes disengaged, said power means being connected to said other lever for forcibly moving said other lever and linkage means and plate in response to control forces on said pedal adapted to be applied thereto, said levers being in unlocked condition during actuation of said other lever by said power means, said means for selectively locking said levers together including a power cylinder element and piston element, means for coupling one said element to said one lever, and means for coupling the other element to said other lever.

6. In the clutch mechanism as defined in claim 5 wherein said power means includes a first fluid power means connected to said other lever for moving said plate in a disengaging direction, valve means fluidly connected to said power cylinder element and to said first means for respectively controlling the locking of said levers and the fluid power being applied to said first means, said valve means being responsive to depression and relaxation of said pedal whereby fluid is supplied to and removed from said first means.

7. In the clutch mechanism as defined in claim 6 wherein said valve means includes an on-off valve for controlling the locking of said levers, said piston element being spring loaded in a direction to lock said levers, said on-off valve being in the on condition to override the spring loading of said piston element whereby to unlock said levers.

8. In the clutch mechanism as defined in claim 6 wherein said valve means includes an on-off valve for controlling the locking of said levers, another valve being in fluid series between said on-off valve and said first means, said other valve being responsive to depression and relaxation of said pedal.

9. In a clutch mechanism comprising a clutch pedal means and a clutch plate means, said clutch pedal means having a predetermined length of stroke for operating said clutch plate means in response to forces adapted to be applied to said pedal means, means for reducing the stroke of said clutch pedal means, and selectively actuatable power means connected between said clutch pedal means and said clutch plate means to forcibly move said clutch plate means in response to control forces on said clutch pedal means adapted to be applied thereto during the reduced stroke of said clutch pedal means, said power means includes a first fluid power means coupled to said clutch plate means for moving same in a disengaging direction, valve means fluidly connected to said first means for controlling the fluid thereto, said valve means being responsive to depression and relaxation of said clutch pedal means whereby fluid is supplied to and removed from said first means, said means for reducing the stroke of said clutch pedal means including a pair of levers respectively coupled to said clutch plate means and said clutch pedal means, said power means including a second fluid power means for selectively locking said levers together whereby upon forcible actuation of said clutch pedal means said clutch plate means becomes disengaged, another valve means fluidly connected to said second means for controlling the fluid thereto, said other valve means supplying fluid to said second means to unlock said levers during powering of said clutch plate means and coupled said lever by said first fluid power means.

10. In a clutch mechanism comprising a clutch pedal and a moveable clutch plate, a pair of levers, first linkage means connecting one of said levers to said pedal, a second linkage means connecting the other of said levers to said plate, selective means for connecting said pedal to said plate alternatively for manual operation and power operation, said selective means including a first mechanical connection means for decoupling and coupling said levers and when coupled to operate said plate in response to pedal movements through a pedal stroke of predetermined distance, said selective means including a second mechanical connection means coupling said pedal to said plate for operation of said plate in response to pedal movement through a reduced stroke of said pedal through a distance less than said predetermined distance, said selective means including power means connected to said other lever for forcibly moving said other lever in response to manual movements of said pedal through said reduced stroke, said selective means including manually operable selection means to selectively enable said pedal to energize said power means and to disable said first mechanical connection means.

11. In the clutch mechanism as defined in claim 10 wherein said selective means includes valve means fluidly connected to said power means for controlling the fluid thereto, said valve means being responsive to depression and relaxation of said pedal through said reduced stroke whereby fluid is supplied to and removed from said power means.

12. In the clutch mechanism as defined in claim 10 wherein said manually operable selection means including valve means fluidly connected to said power means for controlling the fluid thereto, said valve means being responsive to depression and relaxation of said clutch pedal through said reduced stroke whereby fluid is supplied to and removed from said power means.

13. In a clutch mechanism comprising a clutch pedal and a moveable clutch plate, a pair of levers, first linkage means connecting one of said levers to said pedal, a second linkage means connecting the other of said levers to said plate, means for selectively locking said levers together whereby forcible depression of said pedal will cause said plate to become disengaged, and selectively actuatable power means connected to said other lever for forcibly moving said other lever in response to control forces on said pedal adapted to be applied thereto, said levers being in unlocked condition during actuation of said other lever by said power means, said clutch pedal has a predetermined length of stroke for operating said clutch plate in response to forces adapted to be applied to said pedal; means for reducing the stroke of said clutch pedal, said power means forcibly moving said clutch plate during the reduced stroke of said clutch pedal, said means for reducing the stroke of said clutch pedal includes a rack and pinion mechanism connected to each of said levers, said rack and pinion mechanism having a first position when said levers are located together and a second position when said levers are in unlocked condition, and means for selectively locking said rack and pinion mechanism in said second position.

14. In a clutch mechanism comprising a clutch pedal and a moveable clutch plate, a pair of levers, first linkage means connecting one of said levers to said pedal, a second linkage means connecting the other of said levers to said plate, means for selectively locking said levers together whereby forcible depression of said pedal will cause said plate to become disengaged, and selectively actuable power means connected to said other lever for forcibly moving said other lever in response to control forces on said pedal adapted to be applied thereto, said levers being in unlocked condition during actuation of said other lever by said power means, said clutch pedal has a predetermined length of stroke for operating said clutch plate in response to forces adapted to be applied to said pedal, means for reducing the stroke of said clutch pedal, said power means forcibly moving said clutch plate during the reduced stroke of said clutch pedal, said power means including a first fluid power means coupled to said clutch plate for moving same in a disengaging direction, a first valve means fluidly connected to said first fluid power means for controlling the fluid thereto, said first valve means being responsive to depression and relaxation of said clutch pedal, said power means further including a second fluid power means for selectively locking said levers together whereby upon forcible actuation of said clutch pedal said clutch plate becomes disengaged, a second valve means fluidly connected to said second fluid power means for controlling the fluid thereto, said second valve means supplying fluid to said second fluid power means to unlock said levers during powering of said clutch plate and coupled said lever by said first fluid power means.

15. In a clutch mechanism comprising a clutch pedal and a moveable clutch plate, a pair of levers, first linkage means connecting one of said levers to said pedal, a second linkage means connecting the other of said levers to said plate, means for selectively locking said levers together whereby forcible depression of said pedal will cause said plate to become disengaged, and selectively actuatable power means connected to said other lever for forcibly moving said other lever in response to control forces on said pedal adapted to be applied thereto, said levers being in unlocked condition during actuation of said other lever by said power means, said means for selectively locking said levers including a power cylinder element and a piston element, means for coupling one said element to said one lever, and means for coupling the other element to said other lever.

16. In the clutch mechanism as defined in claim 15 wherein said power means includes a first fluid power means connected to said other lever for moving said plate in a disengaging direction, valve means fluidly connected to said power cylinder element and to said first means for respectively controlling the locking of said levers and the fluid power being applied to said first means, said valve means being responsive to depression and relaxation of said pedal whereby fluid is supplied to and removed from said first means.

17. In the clutch mechanism as defined in claim 16 wherein said valve means includes an on-off valve for controlling the locking of said levers, said piston element being spring loaded in a direction to lock said levers, said on-off valve being in the on condition to override the spring loading of said piston element whereby to unlock said levers.

18. In the clutch mechanism as defined in claim 16 wherein said valve means includes an on-off valve for controlling the locking of said levers, another valve being in fluid series between said on-off valve and said first means, said other valve being responsive to depression and relaxation of said pedal.

19. In a clutch mechanism comprising a clutch pedal and a clutch plate wherein said pedal has a pedal stroke of predetermined distance for manual operation of said clutch plate, first linkage means between said pedal and plate for transmitting movements of said pedal to said plate through said pedal stroke, manually operable selection means for connecting said pedal to said plate alternatively for manual operation through said first linkage means and power operation, second linkage means for transmitting movements of said pedal to said plate and for reducing the stroke of said pedal from said predetermined distance of travel during power operation of said clutch plate, and selectively actuatable power means operably connected to said pedal and coupled to said plate for forcibly moving said plate in response to control movements of said pedal, said power means performing the work of moving said plate during control of said pedal in its reduced stroke condition and being inoperable during movements of said pedal in said predetermined distance of travel in which the manual movements of said pedal perform the work of moving said plate.

20. In the clutch mechanism as defined in claim 19 wherein said manually operable selection means includes valve means fluidly connected to said power means for controlling the fluid thereto, said valve means being responsive to depression and relaxation of said clutch pedal through said reduced stroke whereby fluid is supplied to and removed from said power means.

21. In the clutch mechanism as defined in claim 19 wherein said manually operable selection means includes a pair of levers, said manually operable selection means further includes means for selectively locking said levers together whereby upon forcible depression of said pedal said plate becomes disengaged, said power means being connected to said other lever for forcibly moving said other lever and linkage means and plate in response to movements of said pedal, said levers being in unlocked condition by said means for selectively locking said levers while remaining connected, through said second linkage means during actuation of said other lever by said power means.

22. In the clutch mechanism as defined in claim 21 wherein said power means includes a first fluid power means connected to said other lever for moving said plate in a disengaging direction, valve means fluidly connected to said first means for controlling the fluid thereto, said valve means being responsive to depression and relaxation of said pedal through said reduced stroke whereby fluid is supplied to and removed from said first means.

23. In a clutch mechanism comprising a clutch pedal and a clutch plate wherein said pedal has a predetermined length of stroke for operating said clutch plate, linkage means between said pedal and plate for transmitting forces from said pedal to said plate adapted to be applied to said pedal, said linkage means including means for reducing the stroke of said pedal, and selectively actuatable power means operably connected to said linkage means for forcibly moving said plate in response to control forces on said pedal adapted to be applied thereto, said power means performing the work of moving said plate during the operation of said pedal in its reduced stroke condition and being inoperable during normal full stroke condition of said pedal in which the forces adapted to be applied to said pedal perform the work of moving said plate, said means for reducing the stroke of said clutch pedal includes a pair of levers, means for selectively locking said levers together whereby upon forcible depression of said pedal said plate becomes disengaged, said power means being connected to said other lever for forcibly moving said other lever and linkage means and plate in response to control forces on said pedal adapted to be applied thereto, said levers being in unlocked condition during actuation of said other lever by said power means, said means for selectively locking said levers includes a power cylinder element and piston element, means for coupling one said element to said one lever, and means for coupling the other element to said other lever.

24. In the clutch mechanism as defined in claim 23 wherein said power means includes a first fluid power means connected to said other lever for moving said plate in a disengaging direction, valve means fluidly connected to said power cylinder element and to said first means for respectively controlling the locking of said levers and the fluid power being applied to said first means, said valve means being responsive to depression and relaxation of said pedal whereby fluid is supplied to and removed from said first means.

25. In the clutch mechanism as defined in claim 24 wherein said valve means includes an on-off valve for controlling the locking of said levers, said piston element being spring loaded in a direction to lock said levers, said on-off valve being in the on condition to override the spring loading of said piston element whereby to unlock said levers.

26. In the power assisting assembly as defined in claim 24 wherein said valve means includes an on-off valve for controlling the locking of said levers, another valve being in fluid series between said on-off valve and said first means, said other valve being responsive to depression and relaxation of said pedal.

27. In a clutch mechanism comprising a clutch pedal and a clutch plate wherein said pedal has a predetermined length of stroke for operating said clutch plate, linkage means between said pedal and plate for transmitting forces from said pedal to said plate adapted to be applied to said pedal, said linkage means including means for reducing the stroke of said pedal, and selectively actuatable power means operably connected to said linkage means for forcibly moving said plate in response to control forces on said pedal adapted to be applied thereto, said power means performing the work of moving said plate during the operation of said pedal in its reduced stroke condition and being inoperable during normal full stroke condition of said pedal in which the forces adapted to be applied to said pedal perform the work of moving said plate, said power means including a first fluid power means coupled to said clutch plate means for moving same in a disengaging direction, valve means fluidly connected to said first means for controlling the fluid thereto, said valve means being responsive to depression and relaxation of said clutch pedal means whereby fluid is supplied to and removed from said first means, said means for reducing the stroke of said clutch pedal means including a pair of levers respectively coupled to said clutch plate means and said clutch pedal means, said power means including a second fluid power means for selectively locking said levers together whereby upon forcible actuation of said clutch pedal means said clutch plate means becomes disengaged, another valve means fluidly connected to said second means for controlling the fluid thereto, said other valve means supplying fluid to said second means to unlock said levers during powering of said clutch plate means and coupled said lever by said first fluid power means.

28. In the clutch mechanism as defined in claim 27 wherein said means for reducing the stroke of said clutch pedal means includes a rach and pinion mechanism connected to each of said levers, said rack and pinion mechanism having a first position when said levers are locked together and a second position when said levers are in unlocked condition, and means for selectively locking said rack and pinion mechanism in said second position.

29. In the power assisting assembly as defined in claim 28 wherein said means for selectively locking said rack and pinion assembly in said second position comprises a fluid power means and a selective valve means for controlling the supply of fluid thereto, said rack and pinion assembly including a pinion coupled to said pedal means and rack, said fluid power means lockingly engaging said rack upon the supply of fluid thereto and after movement of said pedal means into a reduced stroke position.

* * * * *